United States Patent [19]

Dixon

[11] 4,406,058
[45] Sep. 27, 1983

[54] CONDUIT COUPLING HOLDING APPARATUS

[75] Inventor: Charles Dixon, Osceola, Ark.

[73] Assignee: Southwire Company, Carrollton, Ga.

[21] Appl. No.: 219,632

[22] Filed: Dec. 24, 1980

[51] Int. Cl.³ ............................................. B23Q 7/10
[52] U.S. Cl. ...................................... 29/809; 29/456; 29/237; 29/240
[58] Field of Search ................ 29/237, 240, 809, 781, 29/428, 456

[56] References Cited

U.S. PATENT DOCUMENTS 3,035,336  5/1962  McConnell ........................... 29/240
3,039,181  6/1962  Sawdey ................................. 29/237
3,298,089  1/1967  Long et al. ........................... 29/240

Primary Examiner—Charlie T. Moon
Attorney, Agent, or Firm—Herbert M. Hanegan; Stanley L. Tate; Mike C. Smith

[57] ABSTRACT

Disclosed is an apparatus and method for holding a conduit coupling in place during the process of transporting and attaching the coupling to a length of conduit which substantially eliminates problems with cross threading, coupling and conduit damage, lengths of conduit without couplings and the like.

7 Claims, 3 Drawing Figures

CONDUIT COUPLING HOLDING APPARATUS

BACKGROUND OF THE INVENTION

1. Field of the Invention

The present invention relates generally to processing of tubular products and specifically to an apparatus for holding a conduit coupling in place during the process of transporting it to a length of conduit for attachment thereon.

2. Description of the Prior Art

The manufacture and use of conduit and other tubular products has long been well known in the prior art, as evidenced by U.S. Pat. No. 597,000 which issued in 1898. Since that time many patents have issued disclosing advances in the art. In the present state of the art, conduit processing is highly automated as evidenced by U.S. Pat. Nos. 4,073,978, 4,082,212 and 4,191,319. Although the art is now very sophisticated, one problem remaining unsolved until the present invention has been the tedious process of connecting conduit couplings to the ends of lengths of conduit. Until the present invention, the most accurate method of attaching conduit couplings to conduit has been manual labor. This method is however very cost inefficient so the industry has begun to use less accurate but more efficient mechanisms. In a typical mechanism for fastening couplings to conduits, a coupling supply places a coupling on a coupling transporter which carries the coupling to a predetermined location where it meets the threaded end of a length of conduit. The coupling is held in a spindle which begins to rotate around the longitudinal axis of the conduit as the coupling contacts the conduit thereby screwing the coupling onto the end of the conduit. In such a system, couplings often do not accurately reach the predetermined point and do not become screwed onto the conduit. At times couplings lie in the transporter in an unaligned manner and become cross threaded on the conduit. More often, however, couplings simply fall out of the transporter as a result of movement of the transporter or are pushed out of the transporter and out of processing by coming into abrupt contact with the conduit. In such cases the results include damaged couplings, damaged conduit, conduit missing couplings, and in some situations machine jams. These problems are costly in terms of productivity, machine repair, down time, conduit and coupling inspection and reprocessing.

SUMMARY OF THE INVENTION

The present invention solves the problems associated with attaching a conduit coupling to a length of conduit by providing an apparatus for holding the coupling in place during the process of transporting the coupling to the conduit.

Thus a major object of this invention is to provide an apparatus for holding a conduit coupling in place during the process of transporting the coupling to a length of conduit.

Another object of this invention is to provide an improved mechanism for attaching conduit couplings to lengths of conduit.

Still another object of the present invention is to provide increased productivity in a system for attaching conduit couplings to lengths of conduit.

Yet another object of this invention is to provide an improved coupling attachment system adapted to more accurately align conduit couplings with lengths of conduit.

Another object of the present invention is to provide an improved coupling attachment system adapted to reduce damage to conduit couplings and lengths of conduit.

Still another object of this invention is to provide a conduit coupling holding apparatus adapted to reduce damage to other parts of the coupling attachment system.

Yet another object of this invention is to provide an improved conduit coupling attachment system adapted to reduce the possibility of lengths of conduit leaving the system without couplings attached thereto.

Another object of this invention is to provide an improved conduit coupling attachment system adapted to reduce inspection costs associated with prior art conduit coupling attachment systems.

Another object of this invention is to provide an improved conduit coupling attachment system adapted to reduce reprocessing costs associated with prior art conduit coupling attachment systems.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with the accompanied drawings in which like parts are given like identification numerals and wherein:

DESCRIPTION OF THE PREFERRED EMBODIMENT

Figure 1:
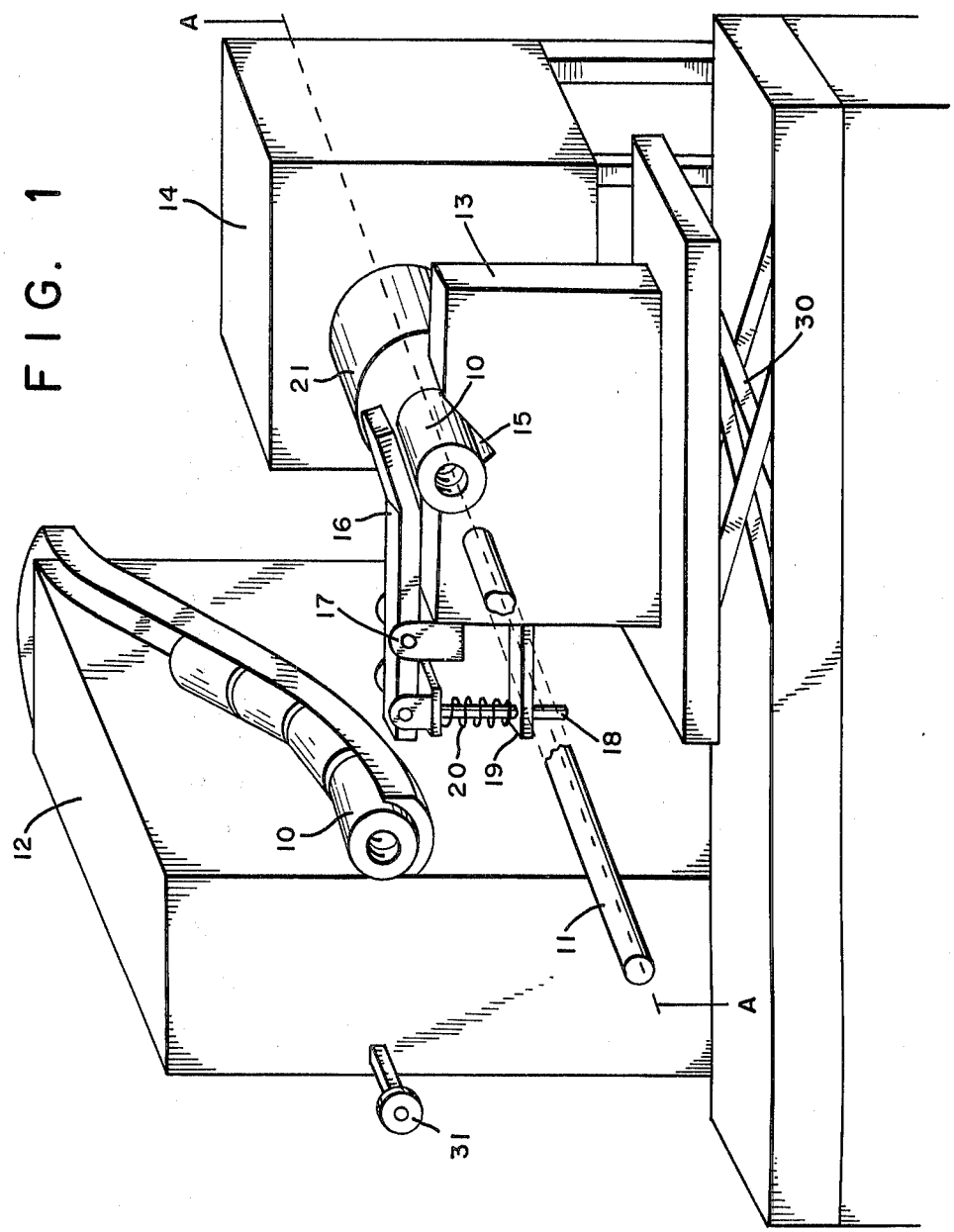
FIG. 1 is a perspective view of the preferred embodiment of the present invention providing a conduit coupling for attachment to a length of conduit.

As FIG. 1 illustrates, an automated process for attaching conduit coupling 10 to a length of conduit 11 comprises a coupling supply means 12, a coupling transporter 13, and a coupling rotation means 14. The process also comprises a conduit control means which is not shown in order to more clearly illustrate the remaining apparatus. As shown in FIG. 1 an internally spiral threaded coupling 10 is held within a symetrical v-slot formed in the top of v-block 15 of the coupling transporter 13 by means of a clamp arm 16. The clamp arm 16 is pivotally attached to the v-block coupling receiver 15 at a pivot yoke 17. Pivotally secured to the non-clamping end of the clamp arm 16 is a push rod 18 which is slidably held in a rod guide 19 which is in turn rigidly attached to the v-block 15. A compressed spring 20 surrounds the portion of the push rod 18 located between the rod guide 19 and the clamp arm 16, thereby constantly applying pressure to force the push rod 18 upward. Such pressure when not counteracted forces the non clamping end of the clamp arm 16 upward and the clamping end of the clamp arm 16 downward by means of pivot yoke 17. Components 16, 17, 18, 19 and 20 consitute a coupling securement means which positively secures the coupling 10 exactly in a predetermined location.

The longitudinal axis of the coupling 10 held by the coupling transporter 13 in this predetermined location coincides with the longitudinal axis A-A of the length of externally spiral threaded conduit 11 held by the conduit control means (not shown) and also with the longitudinal axis A-A of the rotatable chuck 21 of the coupling rotation means 14. As the conduit control means (not shown) advances the length of conduit 11 in the direction of the coupling 10 the conduit 11 pushes the coupling 10 out of the grasp of coupling transporter 13 and into the rotatable chuck 21 which rotates the coupling 10 thereby screwing the coupling 10 onto the conduit 11. Since the coupling 10 remains secure until the conduit 11 alters its location along the longitudinal axis A-A, precise attachment of the coupling 10 on the conduit 11 results. Thus problems associated with cross threading, coupling 10 and conduit 11 damage, lengths of conduit 11 missing couplings 10, machine jams, inspection and reprocessing are substantially eliminated.

Figure 2:
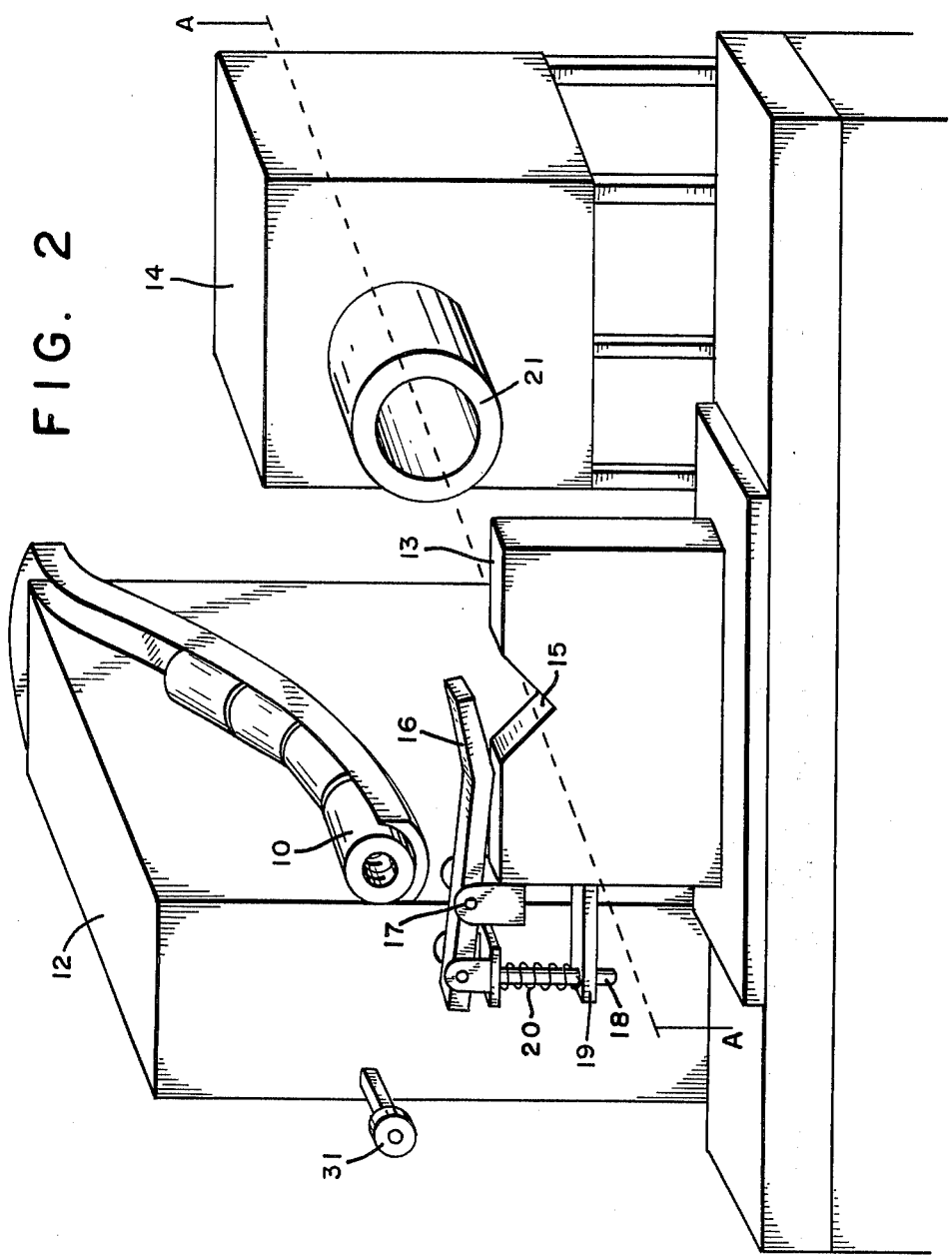
FIG. 2 is a perspective view of the same embodiment in an empty mode moving to receive another coupling.

Referring to FIG. 2, the coupling 10 has been pushed out of the coupling transporter 13 by the length of conduit 11. Under pressure from the compressed spring 20, the clamp arm 16 has pivoted on the pivot yoke 17 moving the clamping end of the clamp arm 16 into a portion of the volume previously occupied by the coupling 10 but excluding the volume of said length of conduit 11 until the lower surface of the clamping end of the clamp arm 16 comes to rest on the upper surface of the v-block 15. Without contacting the length of conduit 11, the entire coupling transporter 13 moves down and laterally away from the predetermined longitudinal axis A-A toward the coupling supply means 12 to obtain a new coupling 10.

Figure 3:
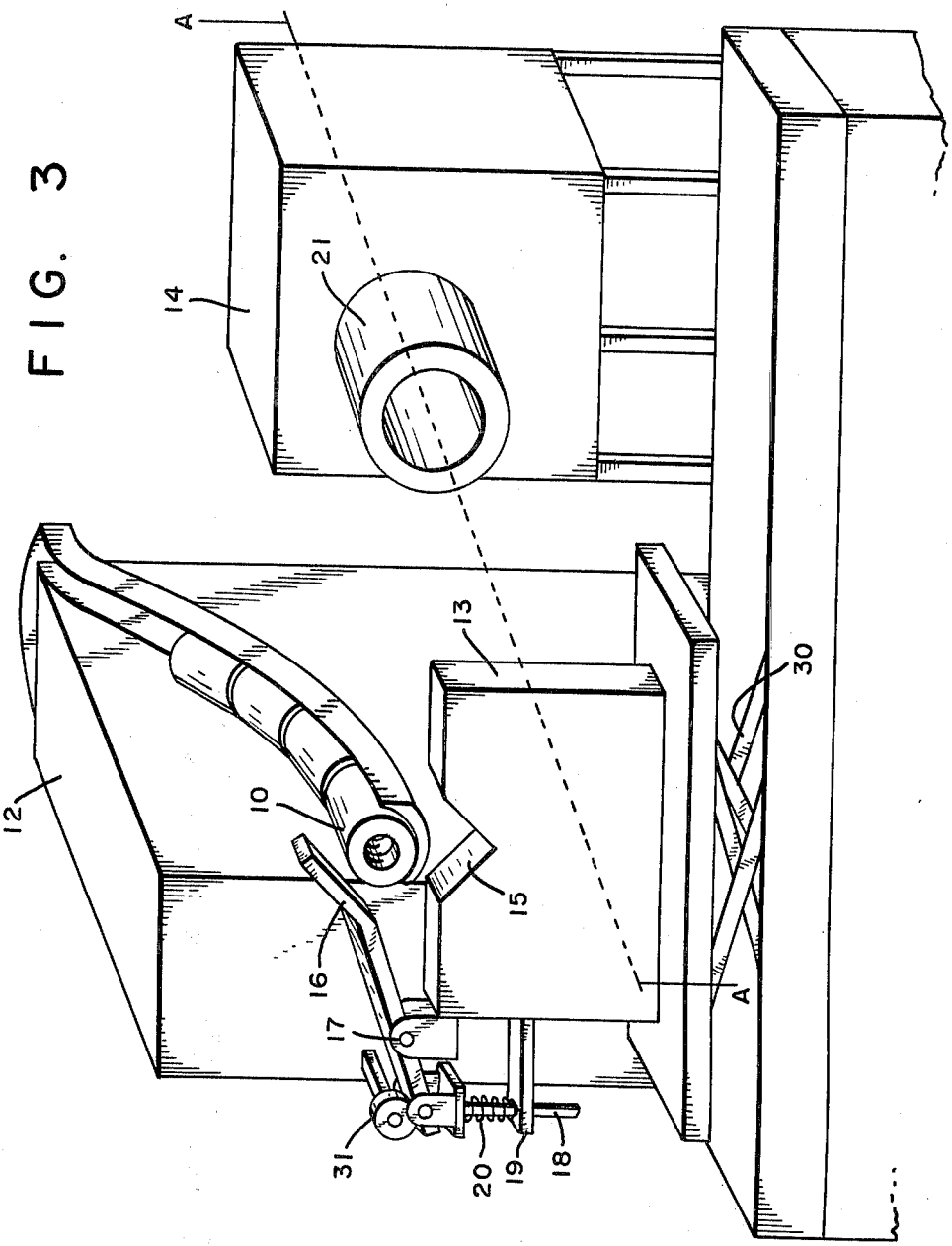
FIG. 3 is a perspective view of the same embodiment receiving another coupling.

In FIG. 3 the coupling transporter 13 has completed its lateral movement away from predetermined axis A-A and has begun to move upward by a means 30 for moving the coupling receiver vertically and laterally. As the transporter 13 rises the top surface of the non clamping end of the clamp arm 16 contacts the bottom surface of a rotatable fixed centered cam 31, thereby overpowering the compressed spring 20 and forcing the push rod 18 and the non clamping end of the clamp arm 16 downward. As a result, the clamp arm 16 pivots on the pivot yoke 17 to free the top central portion of the v-block 15 for introduction of a new coupling 10 in longitudinal alignment parallel with the predetermined axis A-A from the coupling supply means 12. Immediately after insertion of a new coupling 10 at the coupling reception position the coupling transport 13 begins lateral movement toward predetermined axis A-A thereby disengaging cam 31 by allowing it to roll off of clamp arm 16 and allowing the compressed spring 20 to promote controlled securement pressure to grasp the coupling 10 by the clamp arm 16 during carrying of the coupling 16 in parallel disposition with predetermined axis A-A to the predetermined location. Thus the components return to FIG. 1 positions and the transfer cycle begins anew.

While this invention has been described in detail with particular reference to a preferred embodiment thereof, it will be understood that variations and modifications can be effective within the spirit and scope of the invention as described herein before and as defined in the appended claims.

What is claimed is:

1. An apparatus for attaching an internally spiral threaded conduit coupling to an externally spiral threaded length of conduit having a predetermined longitudinal axis comprising:
    (a) conduit coupling supply means;
    (b) conduit coupling transporter means having a v-shaped coupling receiving slot therein and moveably mounted to receive a conduit coupling from said coupling supply means and accurately transport said coupling to a predetermined location concentric with said axis;
    (c) means for moving said transporter vertically and laterally;
    (d) clamp arm means pivotally connected to said transporter;
    (e) push rod means with a compressed spring therearound, pivotally connected to the non-clamping end of said clamp arm at the upper end of said push rod and with the lower end of said push rod passing through rod guide means rigidly secured to said transporter; and
    (f) coupling rotation means mounted at said predetermined location and having a longitudinal axis coincident with the predetermined longitudinal axis of said conduit;
       further provided that said conduit coupling supply means further comprises a rotatable fixed centered cam for reducing securement pressure of said clamp arm in a controlled manner by forcing said push rod and the non-clamping end of said clamp arm downward as said means for moving said transporter moves said transporter upward with said push rod in vertical alignment with said cam thereby providing for reception of a coupling.

2. The apparatus of claim 1 wherein said conduit coupling transporter means further comprises means for accurately transporting the longitudinal axis of said coupling to a predetermined longitudinal axis coincident with the longitudinal axis of said coupling rotation means and coincident with the longitudinal axis of said length of conduit.

3. The apparatus of claim 1 wherein said conduit coupling transporter means further comprises:
    (a) a coupling receiver adapted to carry a coupling from a remote coupling reception position parallel to said predetermined longitudinal axis to a predetermined location coincident with said predetermined longitudinal axis;
    (b) means for moving said coupling receiver vertically and laterally to effect transfer of said conduit coupling to said predetermined location; and
    (c) a coupling securement means adapted to accurately hold said coupling in said coupling receiver during transfer to assure that said coupling remains in said coupling receiver and remains disposed in correct longitudinal alignment to be positively placed correctly in said predetermined location.

4. The apparatus of claim 3 wherein said coupling receiver further comprises a block with a v-shaped slot formed in its top having symetrical surfaces aligned to carry said coupling in parallel disposition from said remote coupling reception position to said predetermined location.

5. The apparatus of claim 3 wherein said coupling securement means further comprises:
    (a) a clamp arm pivotally connected to said block and adapted to provide securement pressure to a coupling resting in said v-shaped slot;

(b) a push rod pivotally connected to the non-clamping end of said clamp arm at the upper end of said push rod and with the lower end of said push rod passing through a rod guide which is rigidly secured to said block to maintain alignment of said push rod; and (c) a compressed spring surrounding said push rod resting on the top surface of said rod guide and adapted to constantly apply upward pressure to force said push rod and the non-clamping end of said clamp arm upward while forcing the clamping end of said clamp arm downward to apply said securement pressure.

6. The apparatus of claim 1 wherein said rotatable fixed centered cam promotes controlled resumption of said securement pressure by allowing the non clamping end of said cam arm to roll out of engagement with said cam as said means for moving said coupling receiver vertically and laterally begins to transfer said coupling from said coupling reception position to said predetermined location.

7. The apparatus of claim 3 wherein said means for moving said coupling receiver vertically and laterally is further adapted to move angularly down and away from said predetermined longitudinal axis in a manner such that no portion of said coupling receiver or of said coupling securement means contacts said length of conduit extending through said predetermined location while the rotation produced by said coupling rotation means screws said coupling onto said length of conduit.

* * * * *